US011562338B2

(12) United States Patent
Eger (10) Patent No.: US 11,562,338 B2
(45) Date of Patent: Jan. 24, 2023

(54) AUTOMATED POINT OF SALE SYSTEMS AND METHODS (71) Applicant: Datalogic IP Tech S.r.l., Bologna (IT)

(72) Inventor: Michael Eger, Bottrop (DE)

(73) Assignee: Datalogic IP Tech S.r.l., Bologna (IT)

(*) Notice: Subject to any disclaimer, the term of this patent is extended or adjusted under 35 U.S.C. 154(b) by 0 days.

(21) Appl. No.: 17/418,715

(22) PCT Filed: Dec. 17, 2019

(86) PCT No.: PCT/IB2019/060912
§ 371 (c)(1),
(2) Date: Jun. 25, 2021

(87) PCT Pub. No.: WO2020/136500
PCT Pub. Date: Jul. 2, 2020

(65) Prior Publication Data
US 2022/0076228 A1 Mar. 10, 2022

Related U.S. Application Data (60) Provisional application No. 62/786,218, filed on Dec. 28, 2018.

(51) Int. Cl.
*G06Q 20/20* (2012.01)
*G06V 20/52* (2022.01)
(Continued)

(52) U.S. Cl.
CPC ....... *G06Q 20/208* (2013.01); *G06K 9/00496* (2013.01); *G06K 9/00523* (2013.01);
(Continued)

(58) Field of Classification Search
CPC .......... G06Q 20/208; G06Q 20/40145; G06Q 20/20; G06Q 30/0641; G06K 9/00496;
(Continued)

(56) References Cited

U.S. PATENT DOCUMENTS 7,100,824 B2   9/2006   Ostrowski et al.
7,246,745 B2   7/2007   Hudnut et al.
(Continued)

FOREIGN PATENT DOCUMENTS

CN   107992871 A   *  5/2018   ......... G06K 9/00288
CN   112150738 A   * 12/2020   ......... G06K 9/00624

OTHER PUBLICATIONS

Excerpts from "Mashgin Express Checkout" youtube video. Obtained from <https://www.youtube.com/watch?v=jo7ooFDtN5o>. Originally published May 2017. (Year: 2017).*
(Continued)

*Primary Examiner* — Nathan A Mitchell
(74) *Attorney, Agent, or Firm* — Cozen O'Connor (57) ABSTRACT An automated point of sale system uses one or more cameras to capture images of food products selected by a user for purchase at a food establishment. The point of sale system then compares the images captured to previously captured reference images of such food products being offered at the establishment to find a match for each product, determines the price of each food product the user has selected based on the comparison and match, identifies an account of the user based on a biometric identification of the user and/or reading information from a machine readable token of the user, and automatically causes the account of the user to be charged or debited for the food products identified, thus reducing the check-out time and increasing efficiency of food establishment point of sale systems.

20 Claims, 6 Drawing Sheets (51) Int. Cl.

| | | |
|---|---|---|
| *G06V 40/16* | (2022.01) | |
| *G06K 9/00* | (2022.01) | |
| *G06Q 20/40* | (2012.01) | |
| *G07G 1/00* | (2006.01) | |
| *G07G 1/01* | (2006.01) | |
| *G06V 20/68* | (2022.01) | |

(52) U.S. Cl.
CPC ... *G06K 9/00536* (2013.01); *G06Q 20/40145* (2013.01); *G06V 20/52* (2022.01); *G06V 40/168* (2022.01); *G06V 40/172* (2022.01); *G07G 1/0054* (2013.01); *G07G 1/01* (2013.01); *G06K 9/0055* (2013.01); *G06V 20/68* (2022.01)

(58) Field of Classification Search
CPC ........... G06K 9/00523; G06K 9/00536; G06K 9/0055; G06V 20/52; G06V 40/168; G06V 40/172; G06V 20/68; G07G 1/0054; G07G 1/01; G07G 1/0063
See application file for complete search history.

(56) References Cited

U.S. PATENT DOCUMENTS

| | | | |
|---|---|---|---|
| 7,646,887 B2 | 1/2010 | Goncalves et al. | |
| 8,267,316 B2 | 9/2012 | Ostrowski et al. | |
| 9,424,495 B1* | 8/2016 | Trevino | G09B 19/0092 |
| 9,495,607 B2 | 11/2016 | Tombari et al. | |
| 10,176,456 B2* | 1/2019 | Puerini | G06Q 10/0875 |
| 2004/0066276 A1* | 4/2004 | Gile | G07C 9/37 340/5.53 |
| 2012/0231424 A1 | 9/2012 | Calman et al. | |
| 2012/0232968 A1* | 9/2012 | Caiman | G06Q 20/322 705/14.4 |
| 2014/0006206 A1 | 1/2014 | Scrivner | |
| 2015/0109451 A1* | 4/2015 | Dhankhar | G06Q 30/0641 348/150 |
| 2019/0005343 A1* | 1/2019 | Srivastava | G06V 10/96 |
| 2019/0065823 A1* | 2/2019 | Srivastava | G06T 7/174 |
| 2019/0147614 A1* | 5/2019 | Hamzic | G01S 15/86 382/154 |
| 2020/0342208 A1* | 10/2020 | Srivastava | G01B 11/245 |
| 2020/0365250 A1* | 11/2020 | Kim | G06K 7/1417 |
| 2021/0174431 A1* | 6/2021 | Dhankhar | G07G 1/0063 |

OTHER PUBLICATIONS

Beckett, Jamie. "Getting Out of Line: AI Lets Shoppers Avoid Long Waits at Checkout". Retrieved from <https://blogs.nvidia.com/blog/2017/01/25/ai-end-checkout-lines/>. Originally published Jan. 2017. (Year: 2017).*

Wu et al. "An intelligent self-checkout system for smart retail," 2016 International Conference on System Science and Engineering (ICSSE), 2016, pp. 1-4. (Year: 2016).*

Zheng et al. "Automatic Cashier System Based on Meal Plate Detection Using Deep Learning". Advances in Engineering Research (AER), vol. 124 2nd International Symposium on Advances in Electrical, Electronics and Computer Engineering (ISAEECE 2017). (Year: 2017).*

International Preliminary Report on Patentability and Written Opinion for PCT/IB2019/060912, dated Jun. 16, 2021, 7 pages.

Datalogic ADC, Inc., 2013, "LaneHawk Enterprise Manager," retrieved from https://www.datalogic.com/Download?path=%2Fupload%2Fmarketlit%2Fdatasheets%2FDS-ENTERPRISEMANAGER-EN.pdf&iddwnfile=10060&name=LaneHawk+Enterprise+Manager+English.pdf, 2 pages.

Datalogic ADC, Inc., 2013, "LaneHawk LH4000," retrieved from Datalogic.com, 2 pages.

Datalogic S.p.A, 2013-2017, "LaneHawk Intelligent Lighting and Camera Unit Quick Reference Guide," retrieved from https://cdn.datalogic.com/upload/res/manuals/adc/lanehawk/820086414.pdf, 16 pages.

Datalogic, 2017/2018, "New Products Innovation is in our DNA," retrieved from Datalogic.com, 16 pages.

International Search Report and Written Opinion for PCT/IB2019/060912, dated Apr. 7, 2020, 9 pages.

Morgan, Rick (Ed.), "Are We Seeing A New Revolution In Retail POS?," Scan: The Data Capture Report, 36(15), RMG Enterprises, Inc., Aug. 16, 2013, 4 pages.

Toshiba Commerce Solutions, Inc., "Toshiba and Datalogic: preventing bottom-of-basket loss in real time," 2014, retrieved from http://tgcs04.toshibacommerce.com/cs/groups/internet/documents/document/dg9z/njy4/~edisp/prod.tos668464.pdf, 4 pages.

* cited by examiner

AUTOMATED POINT OF SALE SYSTEMS AND METHODS

TECHNICAL FIELD

The present disclosure generally relates to point of sale systems, and in particular to increasing efficiencies in the operation of computerized point of sale systems.

BRIEF SUMMARY

A method of operation in a point of sale system may be summarized as including: capturing, by at least one computer processor via at least one camera within an establishment offering food products, one or more images of at least one food product selected by a user for purchase in the establishment; comparing, by at least one computer processor, the captured one or more images of the at least one food product selected by the user to one or more reference images of food products; identifying, by at least one computer processor, the at least one food product selected by the user based on the comparison of the captured one or more images of the at least one food product selected by the user to one or more reference images; determining, by at least one computer processor, at least one price of the at least one food product selected by the user based on the identification of the at least one food product selected by the user; performing, by at least one computer processor: identification of the user based on a machine readable token of the user and/or biometric identification of the user; identifying, by at least one computer processor, an account of the user based on one or more of: a machine readable token of the user and biometric identification of the user; and wherein the at least one computer processor causes the identified account of the user to be charged for the determined at least one price of the at least one food product selected by the user based at least in part on the identification of the user and the comparison of the captured one or more images of the at least one food product selected by the user to the one or more reference images of food products.

Capturing of the image of the at least one food product selected by a user for purchase in the establishment may include discerning between multiple different food products existing concurrently on a tray associated with the user and the comparing the captured one or more images of the at least one food product selected by the user to one or more reference images of food products includes, for each of the discerned multiple different food products existing concurrently on the tray associated with the user, comparing a captured image of the discerned food product existing on the tray associated with the user to one or more reference images.

Identifying of the at least one food product selected by the user based on the comparison of the captured one or more images of the at least one food product selected by the user to one or more reference images may include, for each of the discerned multiple different food products existing concurrently on the tray associated with the user, identifying the discerned food product existing on the tray associated with the user based on the comparison of the captured image of the discerned food product existing on the tray associated with the user to one or more reference images.

Determining of at least one price of the at least one food product selected by the user based on the identification of the at least one food product selected by the user may include, for each of the discerned multiple different food products existing concurrently on the tray associated with the user, determining a price of the discerned food product existing on the tray associated with the user based on the identification of the discerned food product existing on the tray associated with the user.

The method may include capturing, by at least one computer processor via at least one camera, the one or more reference images of food products for comparison to the captured one or more images of the at least one food product selected by the user by capturing images of examples of products currently existing in the establishment.

Performing of the biometric identification of the user may include performing facial recognition of the user, and data representing facial features of the user used in the performing of facial recognition of the user is associated with the account of the user.

The method may further include determining, by at least one computer processor, that the at least one food product was selected by the user for purchase in the establishment.

Identifying of the account of the user may include identifying the account of the user based information encoded in a machine readable token of the user, wherein the machine readable token of the user includes one or more of: an identification card, a smartphone, a computing device, a tablet device, a key fob, a radio frequency identification (RFID) device, a near field communication (NFC) device, a device including a machine readable code thereon, a device that communicates a machine readable code, and a device including an identification tag.

A processor-based point of sale system may be summarized as including: at least one processor; and at least one nontransitory processor-readable medium that stores at least one of processor-executable instructions or data which, when executed by the at least one processor, causes the at least one processor to: receive an indication that a user is at a point of sale checkout station of a cafeteria to pay for multiple different food products existing concurrently on a tray associated with the user at the point of sale checkout station; in response to the indication that the user is at the point of sale checkout station of the cafeteria, capture, via at least one camera at the point of sale checkout station, one or more images of the multiple different food products existing concurrently on the tray associated with the user; discern between the multiple different food products existing concurrently on the tray associated with the user based on comparison of the captured one or more images of the multiple different food products existing concurrently on the tray associated with the user to one or more reference images of example portions of unpackaged meals that change periodically being offered by the cafeteria; identify each of the multiple different food products existing concurrently on the tray associated with the user as food products offered by the cafeteria based on the discernment between the multiple different food products existing concurrently on the tray associated with the user; and determine a total price for the multiple different food products existing concurrently on the tray associated with the user based on the identification of each of the multiple different food products existing concurrently on the tray associated with the user as food products offered by the cafeteria.

The at least one of processor-executable instructions or data, when executed by the at least one processor, further causes the at least one processor to: cause the display, for verification by one or more of: the user and a cashier, to list the multiple different food products existing concurrently on the tray associated with the user based on the discernment between the multiple different food products existing concurrently on the tray associated with the user; and cause the display, for verification by one or more of: the user and a cashier, to list prices of the multiple different food products existing concurrently on the tray associated with the user based on the discernment between the multiple different food products existing concurrently on the tray associated with the user.

The at least one of processor-executable instructions or data, when executed by the at least one processor, further causes the at least one processor to: cause the display to display the captured one or more images of the multiple different food products existing concurrently on the tray associated with the user for verification by one or more of: the user and a cashier.

The at least one of processor-executable instructions or data, when executed by the at least one processor, further causes the at least one processor to: cause the display, for verification by one or more of: the user and a cashier, to display images of the multiple different food products existing concurrently on the tray associated with the user as food products offered by the cafeteria based on the discernment between the multiple different food products existing concurrently on the tray or in the cart associated with the user.

The at least one of processor-executable instructions or data, when executed by the at least one processor, further causes the at least one processor to: identify an account of the user based on one or more of: a machine readable token of the user and biometric identification of the user; and cause the identified account of the user to be charged for the determined total price for the multiple different food products existing concurrently on the tray associated with the user based on the discernment between the multiple different food products existing concurrently on the tray or in the cart associated with the user.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1A:
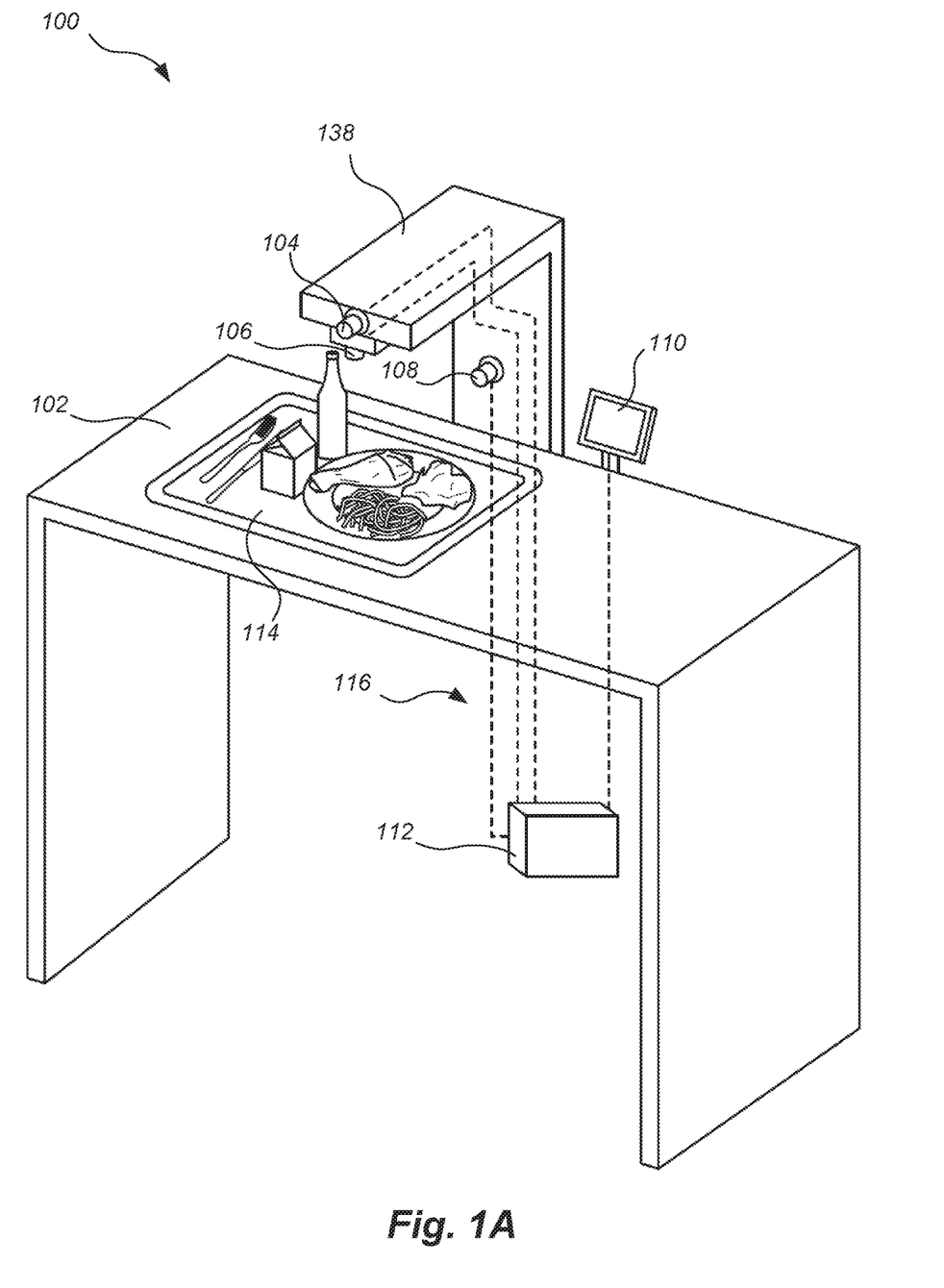
FIG. 1A is a front perspective view of an automated point of sale system, according to one illustrated embodiment.

FIG. 1A is a front perspective view of an automated point of sale system 100, according to one illustrated embodiment. The point of sale system 100 may be that of a cafeteria, canteen, restaurant, convenience store, deli, or any other establishment that sells food products. Shown at point of sale station 102 are two cameras, (a first camera 106 and second camera 108), a user identification device 104, and a display terminal 110 operably connected to a point of sale control system 112 via one or more wired or wireless communication connections 116. Also shown at the point of sale station 102 is an example tray 114 with food products thereon that have been selected by a user for purchase at the establishment. The tray 114 may be associated with a user, for example by defining a logical or digital association based on a perceived or sensed physical association (e.g., proximity, holding of the tray).

The first camera 106, second camera 108, and the user identification device 104 may be coupled to locations on an arm 138 of the point of sale system 100 positioned above the point of sale station 102, or to a wall of the establishment or other component of the point of sale system 100, such that when food products are placed at the point of sale station 102 (e.g., on tray 114), the food products are in view of the first camera 106 and the second camera 108 from different angles and the user identification device 104 is in proximity to a user who selected the food products for purchase. In different embodiments, there may be only one camera or more than two cameras at various locations on the point of sale system 100 or other locations at the establishment to capture images of the food products selected for purchase.

A cafeteria, commonly called a canteen outside of the US, is a type of food service establishment in which there is little or no wait staff table service, whether a restaurant or within an institution such as a large office building, school or government facility. A school or military dining location is also often referred to as a dining hall or canteen. As used herein, "cafeteria" includes cafeterias, canteens, dining halls and buffets. Instead of table service, there are food-serving counters/stalls, either in a line or allowing arbitrary walking paths. Users such as customers take the food products that they desire as they walk along, placing them on a tray. Selection of food products may also change periodically with varying frequency (e.g., daily, weekly, or on a rotating schedule) or as products sell out. In addition, there are often stations where customers order food and wait while it is prepared, particularly for items such as hamburgers, pasta, tacos, stir fry meals and fast food items, which must be served hot and can be immediately prepared. In some cases, for some food products and drinks, such as sodas, water, and the like, customers collect an empty container, pay at the check-out, and fill the container after the check-out or point of sale station.

Users at a cafeteria may be charged a flat rate for admission (as in many buffets). However, it is often the case that users pay at the point of sale station for each food product. This causes delay in the customer check-out line due to a cashier at the point of sale station having to manually identify each item on the customer's tray (e.g., pizza, taco, burrito, hot dog, hamburger, chicken, beef, pork, fish, pasta, combination meal, set meal, salad, potatoes, vegetables, various other side dishes, drinks, etc.) and/or scan a code on prepackaged items. Under control by the point of sale control system 112, the automated point of sale system 100 described herein solves this problem by using one or more cameras (such as camera 106 and camera 108) at the point of sale station 102 to capture images of the food products selected by the customer. The point of sale station 102 then compares the images captured to reference images of those food items to find a match for each item to identify that food product as being the food product represented by the reference image found to be a match. Such reference images may have been captured previously by the point of sale system 100 or other system and, in many instances, may be of samples of the actual food items available at the establishment (which may change periodically). Accordingly, the reference images may be updated periodically as menu items change.

Once identified, the point of sale system 100 may determine the price of each food product the user has selected by referencing a price index or food price database stored by or accessible by the point of sale control system 112. In some embodiments, the point of sale system 100 may list the food products and/or their associated prices on the display terminal 110 as the food products are identified and/or together after all the food products have been identified. This may be for verification by the user and/or a cashier at the establishment. The point of sale system 100 may also or instead display on the display terminal 110 the total price of all the identified products for verification. In some embodiments, no tray is used and the food products are identified individually or as a group when placed in view of the camera 106 and/or camera 108.

The point of sale system 100 then identifies an account of the user based on a biometric identification of the user and/or reading information from a machine readable token of the user. In some embodiments, such identification of the account of the user may be made before or during the identification of the food products on the tray 114. For example, the biometric identification of the user may be via facial recognition, fingerprint scan, rental scan and/or other biometric signature of the user. In such a case, the user identification device 104 may be a scanner and/or camera facing the user to read such biometric data as input. For example, the user identification device 104 may comprise a camera to capture an image of the user, a retinal scanner, a fingerprint scanner and/or a microphone for voice recognition of the user. The automated point of sale system 100 may also or instead identify an account of the user using a machine readable token carried by the user. For example, the machine readable token may be an identification card, a smartphone, a computing device, a tablet device, a key fob, a radio frequency identification (RFID) device, a near field communication (NFC) device, a device including a machine readable code thereon, a device that communicates a machine readable code, and/or a device including an identification tag, etc.

After having identified the account of the user (e.g., based on a biometric identification of the user or reading information from a machine readable token of the user) the point of sale system 100 may then automatically charge or debit the account of the user for the food products identified by the automated point of sale system 100 based on the determined total price of all the food products identified by the automated point of sale system 100, thus reducing the check-out time and increasing efficiency of cafeteria point of sale systems.

Figure 1B:
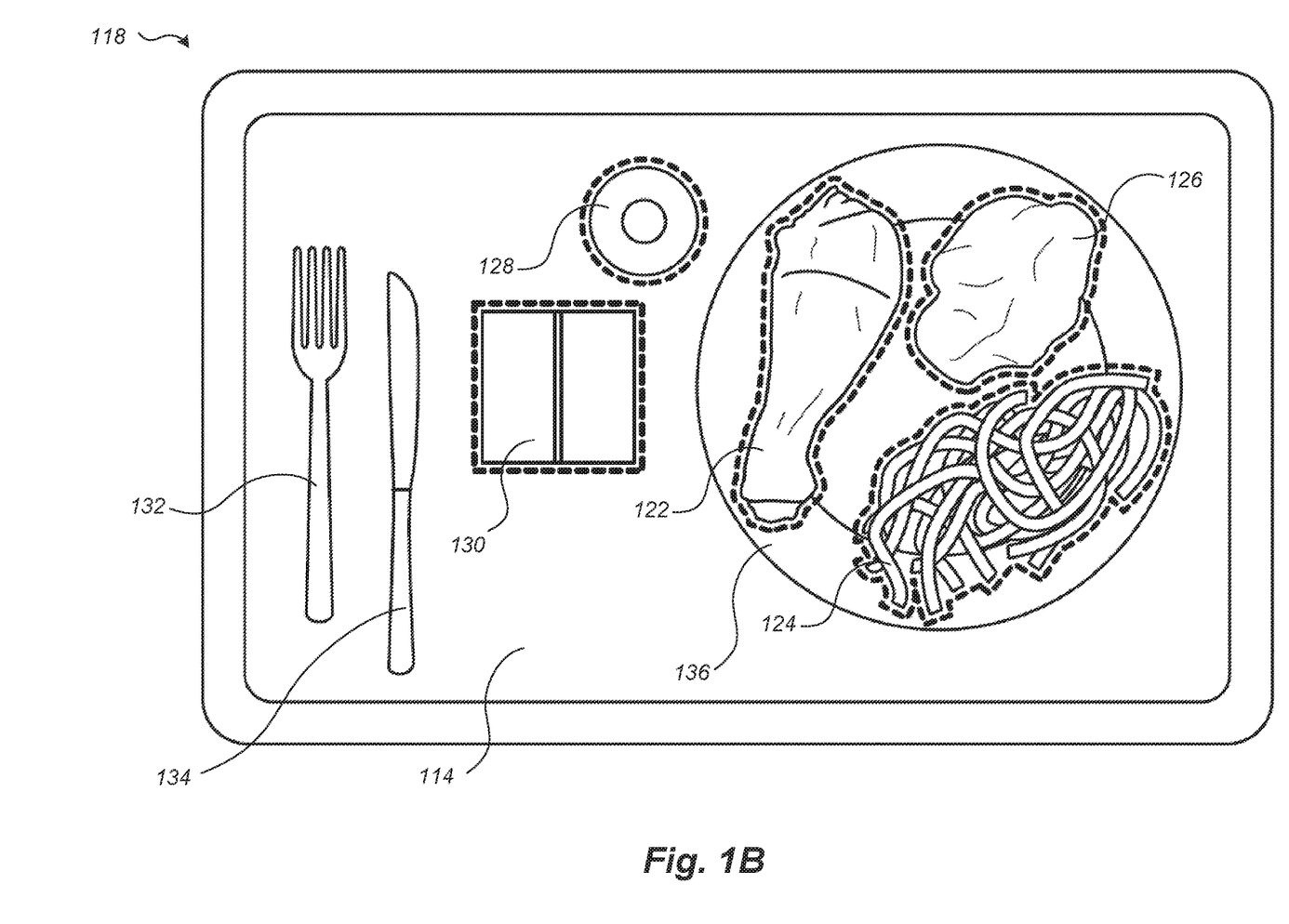
FIG. 1B is an example image taken from a top planar view of the customer cafeteria tray as captured by the point of sale system of FIG. 1A, showing identification by the system of different food products on the tray, according to one illustrated embodiment.

FIG. 1B is an example image 118 captured from a top planar view of the cafeteria tray 114 of the user as captured by the point of sale system 100 of FIG. 1A, showing identification by the system of different food products on the tray 114, according to one illustrated embodiment. In one embodiment, the establishment offering such food products for sale may be cafeteria serving unpackaged meals that change periodically. For example, one or more food products selected by the user may be an unpackaged meal served in the cafeteria that changes periodically. In some embodiments, reference images of example servings of portions of the unpackaged meals that change periodically may be captured each time the meals change.

After the user has selected various food products for purchase at the establishment, the user or a cashier places the selected food products in view of the camera 106. In the present example, the user or service staff has placed food products such as a piece of chicken 122, a side of noodles 124 and a side of mashed potatoes 126 on a plate 136 on the tray 114, as well as prepackaged food products, including a bottle of soda 128 and a carton of milk 130. In some embodiments, the tray having the selected food products thereon will be placed by a user or cashier below camera 106 at the point of sale station 102. In some embodiments, cameras, such as camera 106, may be placed at different areas throughout the cafeteria in the vicinity of where the food product was selected. Placement of the selected food products in view of the camera 106 may trigger camera 106 to capture an image 118 of one or more the selected food products, such as that shown in FIG. 1B. For example, the point of sale control system 112 may use motion sensor, shape detection, object recognition, and/or edge detection systems implemented in hardware and/or software to detect when the food product(s) and/or tray are sufficiently in view of the camera 106 to take a complete image of the selected food products and/or tray 114 on which the food products are placed. In response to the detection of when the food product(s) and/or tray are sufficiently in view of the camera 106, the point of sale control system 112 may cause the camera 106 to capture an image 118 of one or more the selected food products, such as that shown in FIG. 1B. In other embodiments, the user or cashier may press a button or other input device of the point of sale system 100 to cause the point of sale system 100 to capture the image 118 of the selected food products on the tray 114.

In the present example, camera 106 has captured an image 118 of the food products including each of the food products in the captured image. The point of sale control system 112 may use shape detection, texture detection, object recognition, computer vision, edge detection, and/or three dimensional (3D) reconstruction systems and techniques implemented in hardware and/or software to process the captured image 118. The 3D reconstruction may be performed, for example, by using stereoscopic techniques or other techniques using multiple images of the selected food products taken at different angles by the camera 106 and/or other cameras of the point of sale system 100 placed at different angles. Such processing may discern between the multiple different food products existing concurrently on the tray in the image 118 (e.g., between the piece of chicken 122, side of noodles 124, side of mashed potatoes 126, bottle of soda 128 and carton of milk 130). Some examples of various object recognition techniques that may be implemented by the point of sale control system 112 and/or remote system in communication with the point of sale control system 112 are described in U.S. Pat. No. 8,267,316, issued on Sep. 18, 2012, entitled "SYSTEMS AND METHODS FOR MERCHANOSE CHECKOUT" and U.S. Pat. No. 9,495,607, issued on Nov. 15, 2016, entitled "DESCRIBING OBJECT USING EDGE-PIXEL-FEATURE DESCRIPTORS" both of which are incorporated by reference herein in their entirety. Shape detection, texture detection, object recognition, computer vision, edge detection, and/or 3D reconstruction systems and techniques may also be implemented by the point of sale control system 112 to determine an estimated volume, size or weight of the selected food items, which may be used by the point of sale control system 112 to determine prices of individual items based on size, volume or weight.

The discernment between the multiple different food products is represented as dashed lines on image 118 outlining the various different food products detected. Determining the outline of each food product to facilitate discerning between the multiple different food products in the image 118 may be performed by the point of sale control system 112 or remote system processing the image 118 using the shape detection, texture detection, object recognition, computer vision, edge detection, and/or 3D reconstruction systems and techniques. In some embodiments, the image 118 and such dashed lines or other markers outlining the various different food products detected in the image 118 may be presented on the display terminal 110 of the point of sale system 100 for verification by the user and/or cashier. In case of an incorrect detection of or discernment between the selected food products is shown on the display terminal 110, the point of sale control system 112 may recapture and/or process the image further to display indications such as dashed lines outlining the selected food products to show a corrected discernment or detection of the individual food products. The user may then provide input to the point of sale system 100 to indicate a verification of the correct discernment or detection of the individual food products.

For each of the discerned multiple different food products existing concurrently on the tray 114, the point of sale control system 112 or remote system may compare the captured image of the discerned food product existing on the tray 114 to one or more reference images. The point of sale control system 112 or remote system may then identify the individual discerned food product existing on the tray of the user as a food product offered by the establishment based on the comparison of the captured image of the discerned food product existing on the tray 114 to one or more reference images.

For example, the point of sale control system 112 or remote system may match the image of the piece of chicken 122, side of noodles 124, side of mashed potatoes 126, bottle of soda 128 and carton of milk 130 discerned from the image 118 to corresponding reference images of food products offered by the establishment for sale. Such reference images may be stored by and/or accessible by the point of sale control system 112 or a remote system in communication with the point of sale control system 112. The matching process may be performed by the point of sale control system 112 or remote system identifying features of the captured images of the food products (e.g., features of the piece of chicken 122, side of noodles 124, side of mashed potatoes 126, bottle of soda 128 and carton of milk 130 discerned from the image 118) that match features of one or more reference images. The point of sale control system 112 or remote system may then identify at least one of the reference images as being an image of a same type of product as the food product selected by the user based on the identification of features of the captured images of the food product selected by the user that match features of one or more reference images. Based on the point of sale control system 112 matching the food products to the corresponding reference images, the point of sale control system 112 may then identify the piece of chicken 122, side of noodles 124, side of mashed potatoes 126, bottle of soda 128 and carton of milk 130 as a food products offered by the establishment for sale.

A second camera 108 (or additional cameras not shown), may also be used to capture one or more images of the objects on the tray 114 to supplement the one or more images captured by camera 106 to facilitate the discernment and identification of the various objects on the tray 114 or otherwise at the point of sale station 102. For example, the one or more images captured by the second camera 108 may be used in stereoscopic techniques or other object detection, computer vision and/or 3D reconstruction techniques implemented by the point of sale control system 112 or remote system. Such techniques may use multiple images of the selected food products taken at the same or nearly the same time at different angles by camera 106 and second camera 108 and/or other cameras of the point of sale system 100 placed at different angles and locations with respect to the food products selected by the user for purchase. Such techniques using multiple images of the food products generate more accurate representations of the individual food products for comparison and identification.

In some embodiments, the camera 106 and/or second camera 108 may be the camera of a smartphone or other mobile device camera of the user or service staff of the establishment, which has a wireless connectivity to the point of sale control system 112 or other remote system for processing of images of the food products selected by the user for purchase as described herein. Also, in various embodiments, the camera 106 and/or second camera 108 may capture video of the food products selected for purchase. Frames of such video may be used to identify the food products selected by the user for purchase according to the image processing techniques described herein or other video processing techniques for object discernment and/or identification.

The point of sale system 100 may also or instead include one or more laser scanners and/or sensors or light imaging, detection and ranging (LIDAR) scanners and/or sensors coupled to the arm 138, a wall or other component of the point of sale system 100 to provide input to the point of sale control system 112 or remote system in communication with the point of sale control system 112 to perform identification of food products at the point of sale station 102. In such embodiments, the identification may be performed by using object detection procedures comprising laser point feature calculation and prior filtering, 3D segmentation, object classification, and two-dimensional ("2D") position calculation.

In the present example, the user has also placed non-food objects on the tray 114, such a fork 132 and a knife 134, whose images may have also been captured as part of the captured image 118. Using shape detection, texture detection, object recognition, computer vision, edge detection, and/or 3D reconstruction systems and techniques, the point of sale control system 112 or remote system processing the image 118 may disregard such objects as being non-food product objects. For example, the point of sale control system 112 or remote system may determine that the fork 132 and knife 134 are non-food product objects based on a match to such objects not being found within a set of reference images of food products offered by the establishment. The point of sale control system 112 or remote system may then determine a price of the discerned food product existing on the tray 114 based on the identification of the discerned food product.

Figure 2:
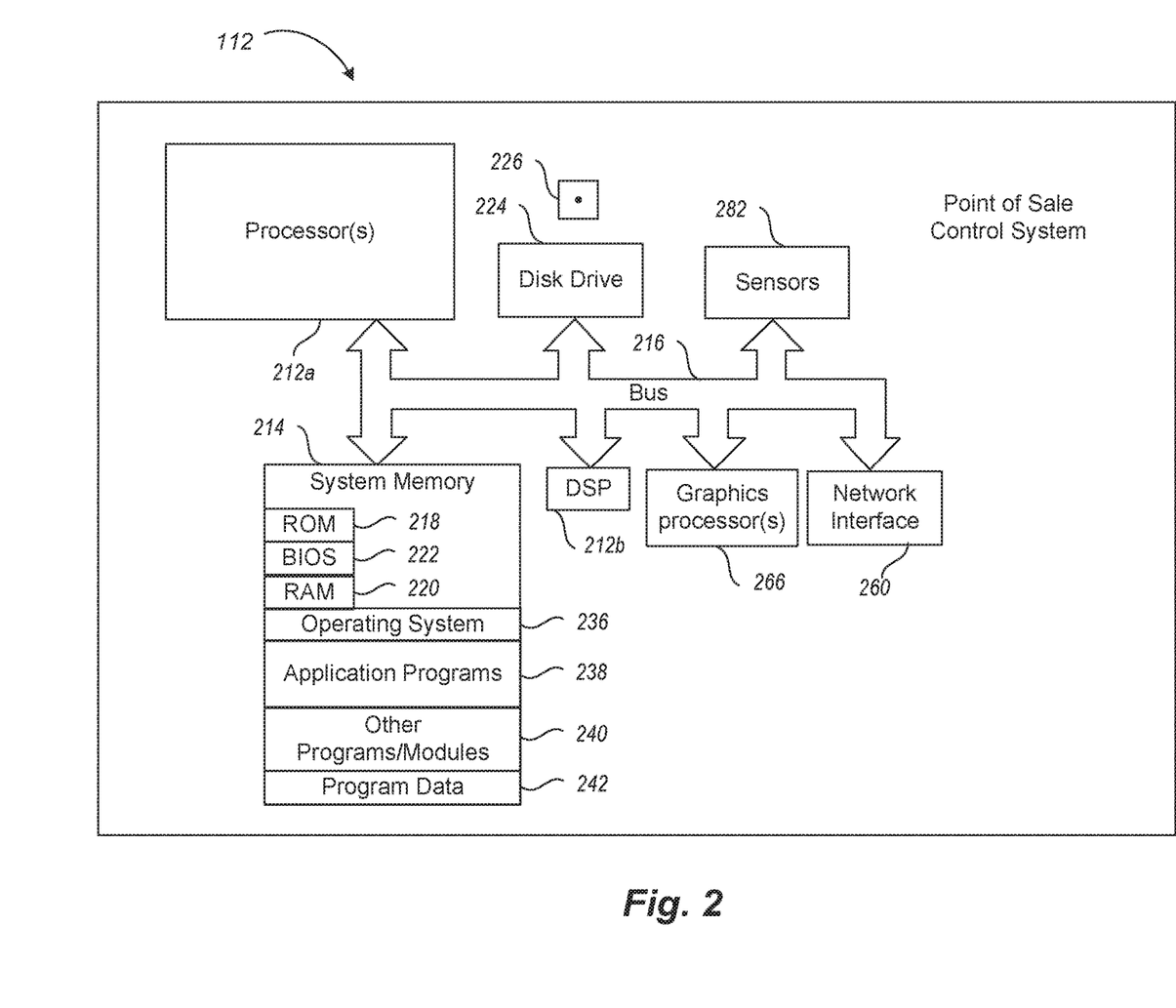
FIG. 2 is a block diagram of a point of sale control system in which various illustrated and described embodiments of the automated point of sale system may be implemented, according to one illustrated embodiment.

FIG. 2 is a block diagram of a point of sale control system 112 in which various illustrated and described embodiments of the automated point of sale system may be implemented, according to one illustrated embodiment. Shown are associated nontransitory computer- or processor-readable storage media, including system memory 214 and computer-readable media 226 associated with disk drive 224, communicatively coupled to processor 212a via one or more communications channels, such as system bus 216. The system bus 216 can employ any known bus structures or architectures, including a memory bus with memory controller, a peripheral bus, and/or a local bus. One or more sensors 282 (e.g., cameras, biometric sensors, scanners, detectors, etc.) and graphics processor(s) 266 are also communicatively coupled to the processor 212a via system bus 216. One or more of such components may also or instead be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

The point of sale control system 112 may also be communicably coupled to remote systems (e.g., desktop computer, laptop computer, ultraportable computer, tablet computer, smartphone, and wearable computer (not shown)) that are directly communicably coupled or indirectly communicably coupled to the various components of the point of sale control system 112 via the network interface 260. Such remote systems may be used to program, configure, control or otherwise interface with or input data to the point of sale control system 112 and various components within the point of sale control system 112. Such a connection may be through one or more communications channels, for example, one or more wide area networks (WANs), for instance, the Internet, using Internet protocols.

The point of sale control system 112 may include one or more processing units 212a, 212b (only two shown, collectively 212), the system memory 214 and the system bus 216 that couples various system components including the system memory 214 to the processing units 212a, 212b. The processing units 212a, 212b may be any logic processing unit, such as one or more central processing units (CPUs) 212a, digital signal processors (DSPs) 212b, application-specific integrated circuits (ASICs), field programmable gate arrays (FPGAs), etc. The system memory 214 may include read-only memory ("ROM") 218 and random access memory ("RAM") 220. A basic input/output system ("BIOS") 222, which can form part of the ROM 218, contains basic routines that help transfer information between elements within the point of sale control system 112, such as during start-up.

The point of sale control system 112 may include a disk drive 224, which may be, for example, a hard disk drive for reading from and writing to a hard disk, a flash memory drive for reading from and writing to removable flash memory devices, an optical disk drive for reading from and writing to removable optical disks, or a magnetic disk drive for reading from and writing to magnetic disks. The point of sale control system 112 may also include any combination of such disk drives in various different embodiments. The disk drive 224 may communicate with the processing units 212a, 212b via the system bus 216. The disk drive 224 may include interfaces or controllers (not shown) coupled between such drives and the system bus 216, as is known by those skilled in the relevant art. The disk drive 224 and its associated computer-readable media 226 provide nonvolatile storage of computer-readable instructions, data structures, program modules and other data for the point of sale control system 112 that implement the processes and techniques described herein. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Program modules can be stored in the system memory 214, such as an operating system 236, one or more application programs 238, other programs or modules 240, and program data 242. Application programs 238 may include instructions that cause the processor(s) 212a, 212b to perform the processes and implement the techniques described herein, including, but not limited to, one or more of: capturing, via at least one camera within an establishment offering food products, one or more images of at least one food product selected by a user for purchase in the establishment; comparing the captured one or more images of the at least one food product selected by the user to one or more reference images of food products; identifying the at least one food product selected by the user based on the comparison of the captured one or more images of the at least one food product selected by the user to one or more reference images; determining at least one price of the at least one food product selected by the user based on the identification of the at least one food product selected by the user; performing one or more of: identification of the user based on a machine readable token of the user and biometric identification of the user; identifying an account of the user based on one or more of: a machine readable token of the user and biometric identification of the user; and charging the identified account of the user for the determined at least one price of the at least one food product selected by the user based on the identification of the user (e.g., biometric identifier, token identifier) and the comparison of the captured one or more images of the at least one food product selected by the user to the one or more reference images of food products. Application programs 238 may additionally include one or more machine-readable instruction sets that cause the processor(s) 212a, 212b to perform other operations of perception, image capture and biometric identification (e.g., via sensors 282), shape detection, texture detection, object recognition, computer vision, edge detection, and/or three dimensional (3D) reconstruction to process the captured images and other data input to the point of sale control system 112.

The point of sale system 100 may include one or more remote processing devices, which are linked through a communications network via network interface 260. Such one or more remote processing devices may execute one or more machine-readable instruction sets that cause the system 100 to perform the processes and implement the techniques described herein, including, but not limited to, one or more of: capturing, via at least one camera within an establishment offering food products, one or more images of at least one food product selected by a user for purchase in the establishment; comparing the captured one or more images of the at least one food product selected by the user to one or more reference images of food products; identifying the at least one food product selected by the user based on the comparison of the captured one or more images of the at least one food product selected by the user to one or more reference images; determining at least one price of the at least one food product selected by the user based on the identification of the at least one food product selected by the user; performing one or more of: identification of the user based on a machine readable token of the user and biometric identification of the user; identifying an account of the user based on one or more of: a machine readable token of the user and biometric identification of the user; and charging the identified account of the user for the determined at least one price of the at least one food product selected by the user based on the identification of the user and the comparison of the captured one or more images of the at least one food product selected by the user to the one or more reference images of food products. Such one or more remote processing devices may execute one or more machine-readable instruction sets that cause the system 100 to perform other operations of biometric identification (e.g., via sensors 282), shape detection, texture detection, object recognition, computer vision, edge detection, and/or three dimensional (3D) reconstruction to process the captured images and other data input to the point of sale control system 112.

While shown in FIG. 2 as being stored in the system memory 214, the operating system 236, application programs 238, other programs/modules 240, and program data 242 can be stored on associated computer-readable media 226 of the disk drive 224.

The processor(s) 212a, 212b may be any logic processing units, such as one or more central processing units (CPUs), digital signal processors (DSPs), application-specific integrated circuits (ASICs), field programmable gate arrays (FPGAs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. Unless described otherwise, the construction and operation of the various blocks shown in FIG. 2 are of conventional design. As a result, such blocks need not be described in further detail herein, as they will be understood by those skilled in the relevant art.

Figure 3:
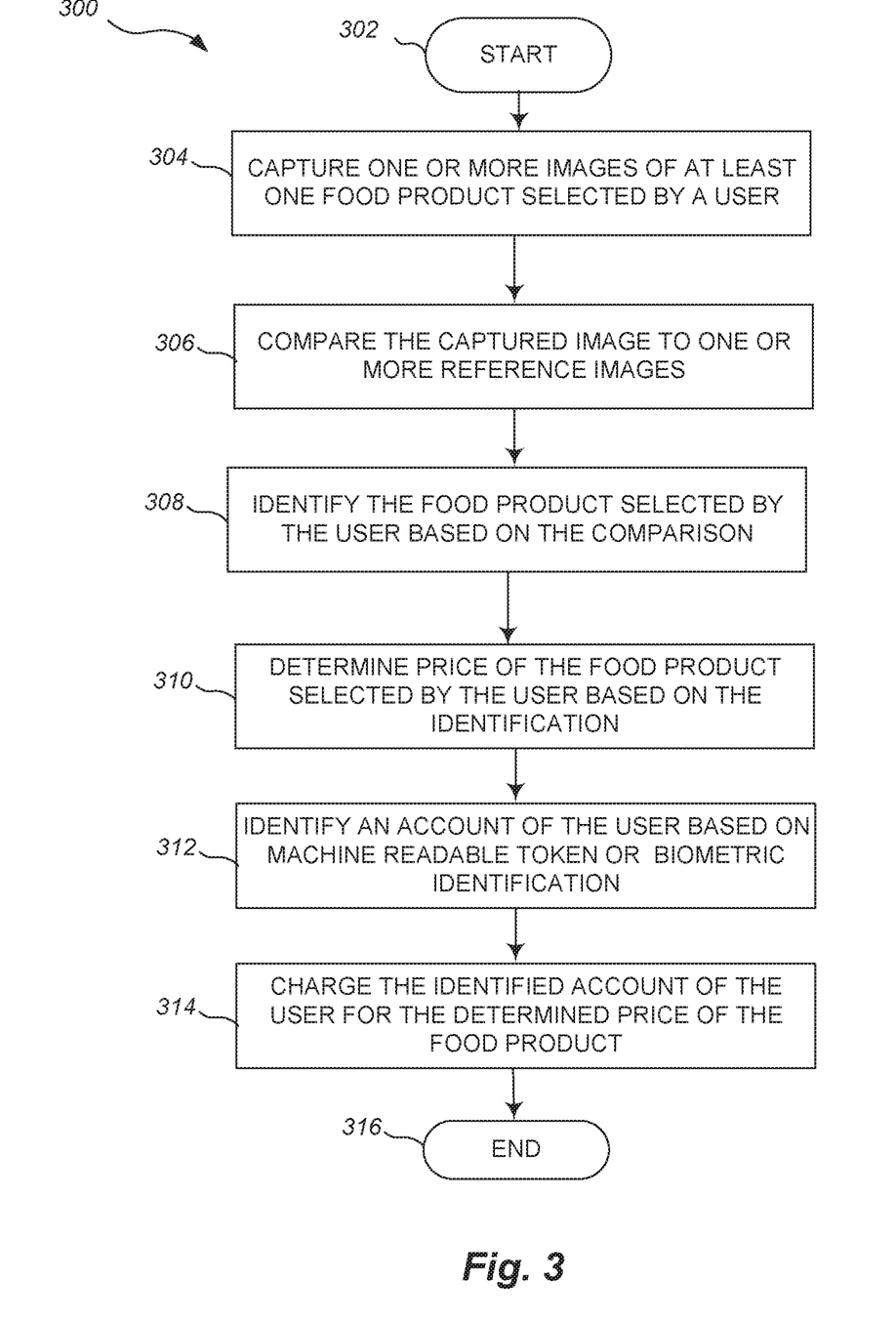
FIG. 3 is a flow diagram showing a first method of operation in a point of sale system, according to a first illustrated embodiment.

FIG. 3 is a flow diagram showing a first method 300 of operation in a point of sale control system 100, according to a first illustrated embodiment. The method 300 of operation in the point of sale system 100 commences at 302.

At 304, the point of sale system 100 captures, via at least one camera within an establishment offering food products, one or more images of at least one food product selected by a user for purchase in the establishment.

At 306, the point of sale system 100 compares the captured one or more images of the at least one food product selected by the user to one or more reference images of food products.

At 308, the point of sale system 100 identifies the at least one food product selected by the user based on the comparison of the captured one or more images of the at least one food product selected by the user to one or more reference images.

At 310, the point of sale system 100 determines at least one price of the at least one food product selected by the user based on the identification of the at least one food product selected by the user.

At 312, the point of sale system 100 performs one or more of: identification of the user based on a machine readable token of the user and biometric identification of the user.

At 314, the point of sale system 100 charges or debits the identified account of the user for the determined at least one price of the at least one food product selected by the user based on the identification of the user and the comparison of the captured one or more images of the at least one food product selected by the user to the one or more reference images of food products.

The method 300 of operation in the point of sale system 100 according to the first illustrated embodiment concludes at 316.

Figure 4:
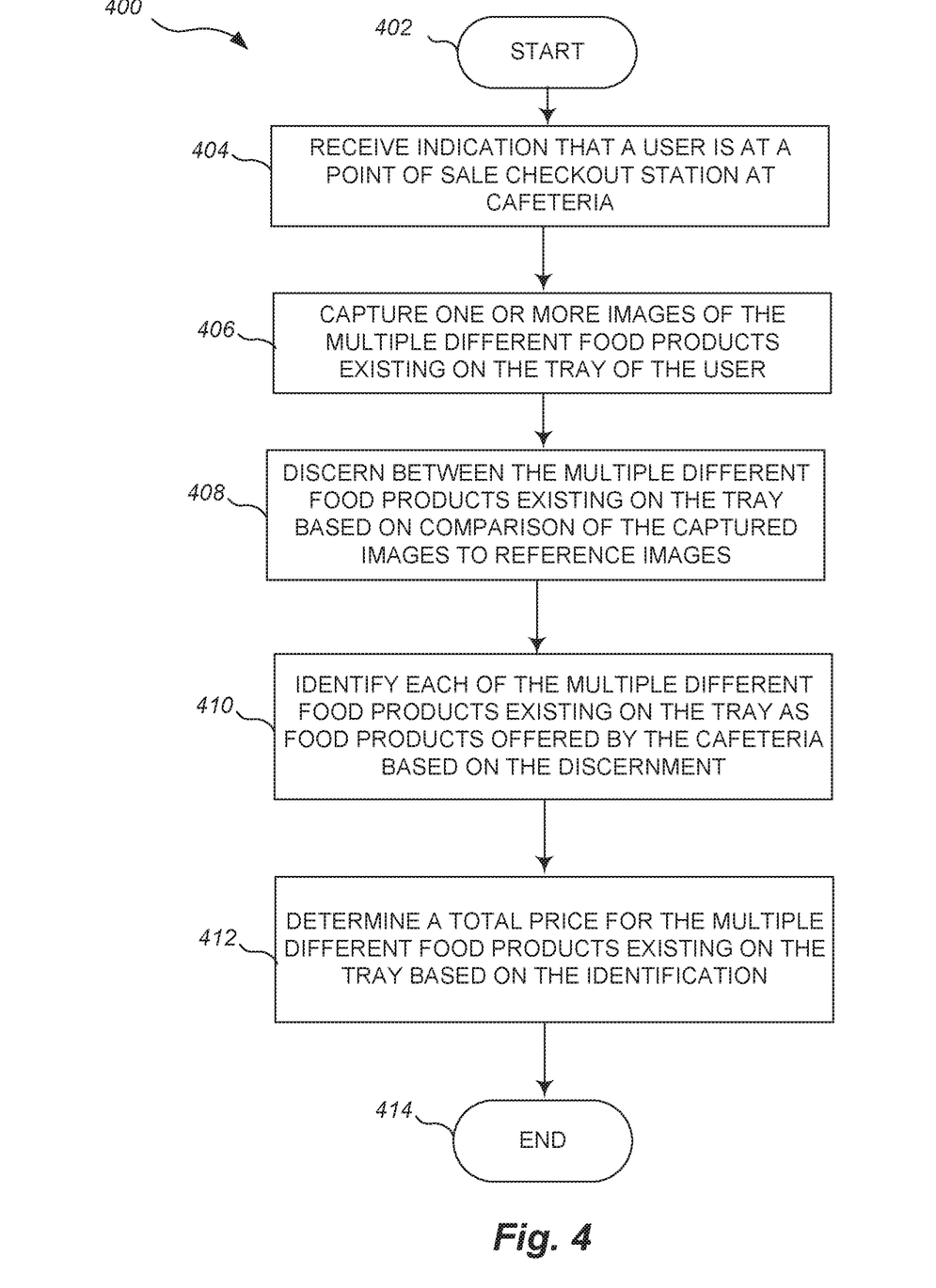
FIG. 4 is a flow diagram showing a second method of operation in a point of sale system, according to a second illustrated embodiment.

FIG. 4 is a flow diagram showing a second method 400 of operation in a point of sale system 100, according to a second illustrated embodiment. The method 400 of operation in the point of sale system 100 commences at 402.

At 404, the point of sale system 100 receives an indication that a user is at a point of sale checkout station of a cafeteria to pay for multiple different food products existing concurrently on a tray of the user at the point of sale checkout station.

At 406, the point of sale system 100 captures, via at least one camera at the point of sale checkout station, one or more images of the multiple different food products existing concurrently on the tray of the user. This may be in response to the indication that the user at the point of sale checkout station of the cafeteria.

At 408, the point of sale system 100 discerns between the multiple different food products existing concurrently on the tray of the. This discernment may be based on comparison of the captured one or more images of the multiple different food products existing concurrently on the tray of the user to one or more reference images of example portions of unpackaged meals that change periodically being offered by the cafeteria.

At 410, the point of sale system 100 identifies each of the multiple different food products existing concurrently on the tray of the user as food products offered by the cafeteria based on the discernment between the multiple different food products existing concurrently on the tray of the user.

At 412, the point of sale system 100 determines a total price for the multiple different food products existing concurrently on the tray of the user based on the identification of each of the multiple different food products existing concurrently on the tray of the user as food products offered by the cafeteria.

The method 400 of operation in the point of sale system 100 according to the second illustrated embodiment concludes at 414.

Figure 5:
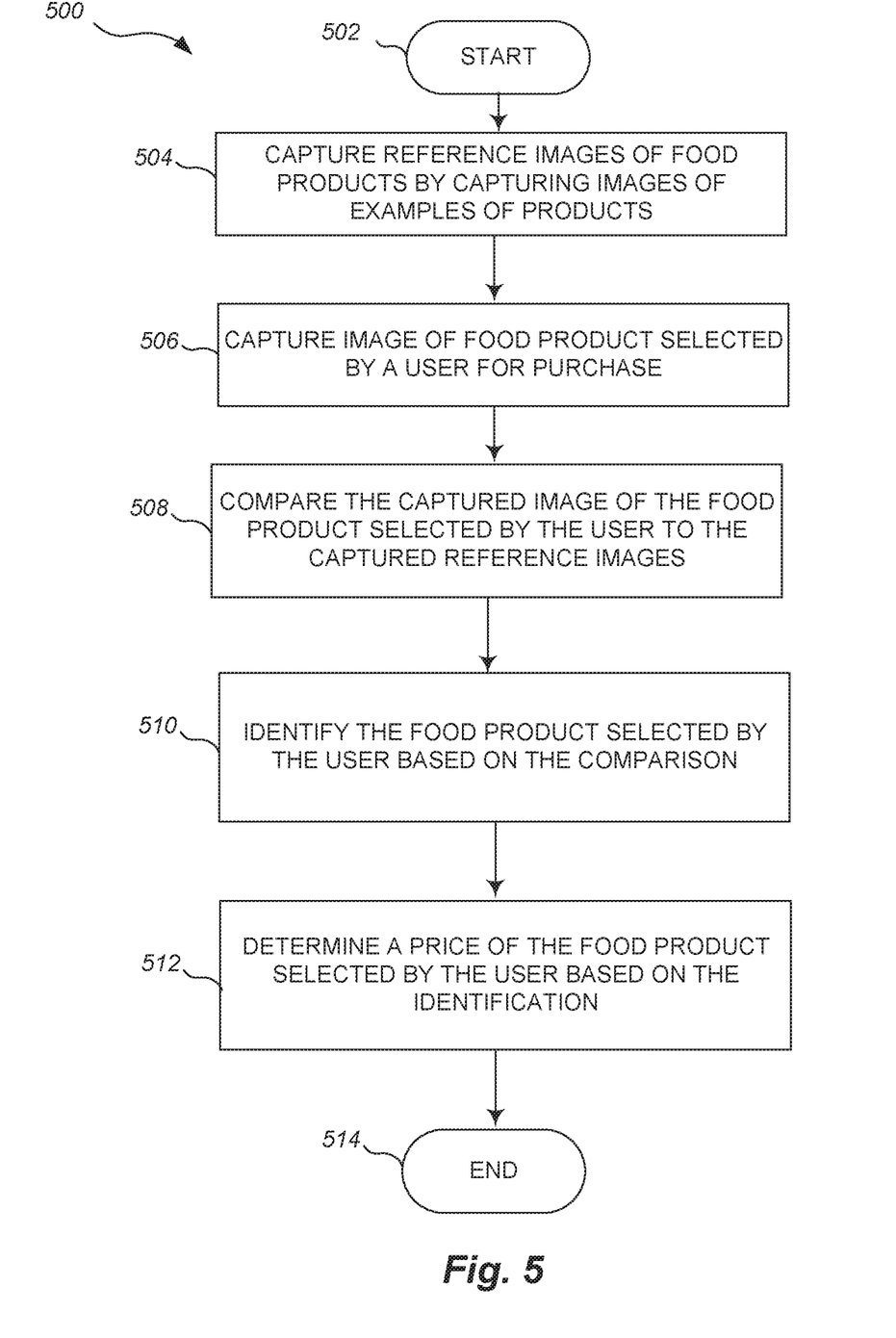
FIG. 5 is a flow diagram showing a third method of operation in a point of sale system, according to a third illustrated embodiment.

FIG. 5 is a flow diagram showing a third method 500 of operation in a point of sale system 100, according to a third illustrated embodiment. The method 500 of operation in the point of sale system 100 commences at 502.

At 504, the point of sale system 100 captures, via at least one camera, one or more reference images of food products by capturing images of examples of products currently existing in an establishment offering food products.

At 506, the point of sale system 100 captures, via at least one camera within the establishment, one or more images of at least one food product selected by a user for purchase in the establishment.

At 508, the point of sale system 100 compares the captured one or more images of the at least one food product selected by the user to the captured one or more reference images of food products.

At 510, the point of sale system 100 identifies the at least one food product selected by the user based on the comparison of the captured one or more images of the at least one food product selected by the user to one or more reference images.

At 512, the point of sale system 100 determines at least one price of the at least one food product selected by the user based on the identification of the at least one food product selected by the user.

The method 500 of operation in the point of sale system 100 according to the third illustrated embodiment concludes at 514.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as hard disk drives, CD ROMs and computer memory.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a point of sale system, the method comprising:
   capturing, by at least one computer processor via at least one camera within an establishment offering food products, one or more images having multiple different food products concurrently within the image for being selected by a user for purchase in the establishment;
   discerning between multiple different food products existing concurrently within the respective image;
   displaying, on a display, the captured one or more images with one or more visual markers indicating the discernment of the multiple different food products concurrently displayed within the respective image;
   recapturing and/or reprocessing one or more images of the multiple different food products to discern between the multiple different food products existing concurrently within the respective image in response to determining that an incorrect detection of discernment was depicted in the displayed images;
   displaying the one or more images of the multiple different food products existing concurrently with one or more updated visual markers indicating a corrected discernment of the multiple different food products;
   receiving an input from one of a user or a cashier to indicate verification of the correct discernment of the multiple different food products;
   comparing, by at least one computer processor, the captured one or more images of the multiple different food products selected by the user to one or more reference images of food products;
   identifying, by at least one computer processor, the multiple different food products selected by the user based on the comparison of the captured one or more images of the multiple different food products selected by the user to one or more reference images;
   determining, by at least one computer processor, at least one price of the multiple different food products selected by the user based on the identification of the multiple different food products selected by the user;

performing, by at least one computer processor: identification of the user based on a machine readable token of the user and/or biometric identification of the user;

identifying, by at least one computer processor, an account of the user based on one or more of: a machine readable token of the user and biometric identification of the user; and wherein the at least one computer processor causes the identified account of the user to be charged for the determined at least one price of the multiple different food products selected by the user based at least in part on the identification of the user and the comparison of the captured one or more images of the multiple different food products selected by the user to the one or more reference images of food products.

2. The method of claim 1, further comprising:

capturing, by at least one computer processor via at least one camera, the one or more reference images of food products for comparison to the captured one or more images of the multiple different food products selected by the user by capturing images of examples of products currently existing in the establishment.

3. The method of claim 2 wherein the establishment is a cafeteria serving unpackaged meals that change periodically, the multiple different food products selected by the user is an unpackaged meal served in the cafeteria that changes periodically, and the capturing of the one or more reference images of food products for comparison to the captured one or more images of the multiple different food products selected by the user includes capturing images of example servings of portions of the unpackaged meals that change periodically.

4. The method of claim 1 wherein the identifying of the multiple different food products selected by the user based on the comparison of the captured one or more images of the multiple different food products selected by the user to one or more reference images includes:

identifying features of the captured one or more images of the multiple different food products that match features of one or more reference images; and identifying at least one of the one or more reference images as being an image of a same type of product as the multiple different food products selected by the user based on an identification of features of the captured one or more images of the at multiple different food products selected by the user that match features of at least one of the one or more reference images.

5. The method of claim 1 wherein the performing of the biometric identification of the user includes performing facial recognition of the user, and data representing facial features of the user used in the performing of facial recognition of the user is associated with the account of the user.

6. The method of claim 1, further comprising determining, by at least one computer processor, that the multiple different food products was selected by the user for purchase in the establishment.

7. The method of claim 6 wherein the determining that the multiple different food products was selected by the user for purchase in the establishment includes:

capturing, by at least one computer processor via at least one camera within the establishment, an image of the user within the establishment without the multiple different food products being in possession of the user;

capturing, by at least one computer processor via at least one camera of the establishment, an image of the multiple different food products in possession of the user at a location within a pre-determined area relative to an exit of the establishment; and determining, by at least one computer processor, that the multiple different food products was selected by the user for purchase in the establishment based on the captured image of the user within the establishment without the multiple different food products being in possession of the user and the captured image of the multiple different food products in possession of the user at a location within a pre-determined area relative to an exit of the establishment.

8. The method of claim 1 wherein the identifying of the account of the user includes identifying the account of the user based information encoded in a machine readable token of the user, wherein the machine readable token of the user includes one or more of: an identification card, a smartphone, a computing device, a tablet device, a key fob, a radio frequency identification (RFID) device, a near field communication (NFC) device, a device including a machine readable code thereon, a device that communicates a machine readable code, and a device including an identification tag.

9. A processor-based point of sale system, comprising:

at least one processor; and a display operably coupled with the at least one processor;

at least one nontransitory processor-readable medium that stores at least one of processor-executable instructions or data which, when executed by the at least one processor, causes the at least one processor to:

receive an indication that a user is at a point of sale checkout station of a cafeteria to pay for multiple different food products existing concurrently on a tray associated with the user at the point of sale checkout station;

in response to the indication that the user is at the point of sale checkout station of the cafeteria, capture, via at least one camera at the point of sale checkout station, one or more images of the multiple different food products existing concurrently on the tray;

discern between the multiple different food products existing concurrently on the tray based on comparison of the captured one or more images of the multiple different food products existing concurrently on the tray to one or more reference images of example portions of unpackaged meals that change periodically being offered by the cafeteria;

identify each of the multiple different food products existing concurrently on the tray as food products offered by the cafeteria based on the discernment between the multiple different food products existing concurrently on the tray;

cause the display to display the captured one or more images of the multiple different food products existing concurrently on the tray along with one or more visual markers indicating the discernment of the multiple different food products;

recapture and/or reprocess one or more images of the multiple different food products existing concurrently on the tray to discern between the multiple different food products existing concurrently on the tray in response to determining that an incorrect detection of discernment was depicted in the displayed images;

cause the display to display the one or more images of the multiple different food products existing concurrently on the tray along with one or more updated visual markers indicating a corrected discernment of the multiple different food products;

receive an input from one of a user or a cashier to indicate verification of the correct discernment of the multiple different food products; and determine a total price for the multiple different food products existing concurrently on the tray based on the identification of each of the multiple different food products existing concurrently on the tray as food products offered by the cafeteria.

10. The processor-based point of sale system of claim 9, further comprising a display coupled to the at least one processor and wherein the at least one of processor-executable instructions or data, when executed by the at least one processor, further causes the at least one processor to:

cause the display, for verification by one or more of: the user or a cashier, to list the multiple different food products existing concurrently on the tray based on the discernment between the multiple different food products existing concurrently on the tray; and cause the display, for verification by one or more of: the user or a cashier, to list prices of the multiple different food products existing concurrently on the tray based on the discernment between the multiple different food products existing concurrently on the tray.

11. The processor-based point of sale system of claim 9 wherein the at least one of processor-executable instructions or data, when executed by the at least one processor, cause the at least one processor to:

capture one or more images via at least one camera, at the point of sale checkout station, of at least two of: a serving of cooked meat, a serving of cooked vegetables, a serving of cooked pasta and a serving of bread existing concurrently on the tray at the point of sale checkout station;

discern between the at least two of: a serving of cooked meat, a serving of cooked vegetables, a serving of cooked pasta and a serving of bread existing concurrently on the tray based on the captured one or more images; and determine the total price for the multiple different food products existing concurrently on the tray based on the discernment between the at least two of: a serving of cooked meat, a serving of cooked vegetables, a serving of cooked pasta and a serving of bread existing concurrently on the tray.

12. A non-transitory computer-readable medium having computer-executable instructions stored thereon that, when executed by at least one processor, cause the at least on processor to:

capture, via at least one camera, one or more reference images of food products by capturing images of examples of products currently existing in an establishment offering food products;

capture, via at least one camera within the establishment, one or more images of multiple different food products selected by a user for purchase in the establishment;

discern between multiple different food products existing concurrently within the respective image;

display, via a display, the captured one or more images with one or more visual markers indicating the discernment of the multiple different food products concurrently displayed within the respective image;

recapture and/or reprocess one or more images of the multiple different food products to discern between the multiple different food products existing concurrently within the respective image in response to determining that an incorrect detection of discernment was depicted in the displayed images;

display the one or more images of the multiple different food products existing concurrently with one or more updated visual markers indicating a corrected discernment of the multiple different food products;

receive an input from one of a user or a cashier to indicate verification of the correct discernment of the multiple different food products;

compare the captured one or more images of the multiple different food products selected by the user to the captured one or more reference images of food products;

identify the multiple different food products selected by the user based on the comparison of the captured one or more images of the multiple different food products selected by the user to one or more reference images; and determine at least one price of the multiple different food products selected by the user based on the identification of the multiple different food products selected by the user.

13. The non-transitory computer-readable medium of claim 12 wherein the computer-executable instructions stored thereon, when executed by the at least one processor, cause the at least on processor to:

identify features of the captured one or more images of the multiple different food products that match features of one or more reference images; and identify at least one of the one or more reference images as being an image of a same type of product as the multiple different food products selected by the user based on an identification of features of the captured one or more images of the multiple different food products selected by the user that match features of at least one of the one or more reference images.

14. The non-transitory computer-readable medium of claim 12 wherein the computer-executable instructions stored thereon, when executed by the at least one processor, cause the at least one processor to: determine that the multiple different food products was selected by the user for purchase in the establishment.

15. The non-transitory computer-readable medium of claim 12 wherein the computer-executable instructions stored thereon, when executed by the at least one processor, cause the at least on processor to:

capture, via at least one camera within the establishment, an image of the user within the establishment without the multiple different food products being in possession of the user;

capture, via at least one camera of the establishment, an image of the multiple different food products in possession of the user at a location within a pre-determined area relative to an exit of the establishment; and determine that the multiple different food products was selected by the user for purchase in the establishment based on the captured image of the user within the establishment without the multiple different food products being in possession of the user and the captured image of the multiple different food products in possession of the user at a location within a pre-determined area relative to an exit of the establishment.

16. The method of claim 1 wherein the one or more visual markers include dashed lines that outline each food product.

17. The method of claim 1, further comprising determining an estimated volume or size of a portion of a food item based on image analysis of the one or more images, and determining a price of the individual item based on the volume or size determination.

18. The processor-based point of sale system of claim 9 wherein the at least one camera used for capturing the one or more images is a mobile device camera of the user or the cashier that is wireless connected to the point of sale system for the processor of the point of sale system to perform the processing and analysis on the one or more images.

19. The processor-based point of sale system of claim 9 wherein the at least one of processor-executable instructions or data, when executed by the at least one processor, cause the at least one processor to: determine an estimated volume or size of a portion of a food item based on image analysis of the one or more images, and determine a price of the individual item based on the volume or size determination.

20. The processor-based point of sale system of claim 9 wherein the one or more visual markers include dashed lines that outline each food product.

* * * * *